United States Patent [19]

Nilsson

[11] Patent Number: 4,999,565
[45] Date of Patent: Mar. 12, 1991

[54] APPARATUS FOR CONTROLLING THE REACTIVE IMPEDANCE OF A TRANSMISSION LINE

[75] Inventor: Stig L. Nilsson, Cupertino, Calif.

[73] Assignee: Electric Power Research Institute, Palo Alto, Calif.

[21] Appl. No.: 459,991

[22] Filed: Jan. 2, 1990

[51] Int. Cl.⁵ .................................................. G05F 1/12
[52] U.S. Cl. ...................................... 323/210; 323/209
[58] Field of Search ............... 323/205, 208, 209, 210, 323/211

[56] References Cited

U.S. PATENT DOCUMENTS

| | | | |
|---|---|---|---|
| 3,703,680 | 11/1972 | Frank et al. | 323/210 |
| 3,731,183 | 5/1973 | Johnson | 323/210 |
| 4,234,843 | 11/1980 | Gyugyi et al. | 323/210 |
| 4,292,545 | 9/1981 | Hingorani | 323/210 |
| 4,470,005 | 9/1984 | Gyugyi | 323/210 |
| 4,829,229 | 5/1989 | Johansson et al. | 323/209 |

OTHER PUBLICATIONS

International Conference on Large High Voltage Electric Systems, 1988 Session (28 Aug.-3 Sep.) "Case Studies of Conventional and Novel Methods of Reactive Power Control, etc.", Taylor et al.
E. W. Kimbark—"Improvement of System Stability by Switched Series Capacitors" (IEEE Transactions on Power Apparatus and Systems, vol. PAS-85, Feb. 1966, pp. 180–188).
Narain G. Hingorani, Jul. 14, 1987, "Future Opportunities for Electric Power Systems".

*Primary Examiner*—Steven L. Stephan
*Assistant Examiner*—Jeffrey Sterrett
*Attorney, Agent, or Firm*—Flehr, Hohbach, Test, Albritton & Herbert

[57] ABSTRACT

Apparatus for controlling the reactive impedance of a transmission line where capacitive reactance is inserted in series in the line to compensate inductive reactance includes a plurality of three or more capacitor modules connected to each other in series to form a series combination of capacitor modules. Each module is individually bypassed by fast acting thyristor bypass switches so that a central automatic control system can selectively place all of the modules in series where a maximum compensation level is achieved (meaning that the total reactive impedance is at a minimum level), or to provide a minimum change with just one capacitor module.

7 Claims, 4 Drawing Sheets

APPARATUS FOR CONTROLLING THE REACTIVE IMPEDANCE OF A TRANSMISSION LINE

The present invention is directed to apparatus for controlling the reactive impedance of a transmission line, and more particularly, to the insertion of series capacitance.

BACKGROUND OF THE INVENTION

Reactive power control of AC transmission lines is desired to control power factor or control currents and voltages. Of course, both inductors and capacitors may be utilized. Such systems are termed in the art a "static VAR." The acronym "VAR" stands for volt-ampere reactive. And a general discussion of reactive power control and actual experiments is contained in Bulletin 13-02 of the "International Conference on High Voltage Electric Systems" dated Aug. 28 through Sept. 3, 1988.

In that bulletin there is a discussion of the use of "switched series capacitors," as illustrated in FIG. 1 of the drawings. Here in series with a transmission line 10 designated $X_L$ with the generator end being 10a and the load end 10b there are inserted series capacitors $X_1$ through $X_n$. These are switched by associated series switches $S_1$ through $S_n$. These series switches S and capacitors X are in parallel with one another. By selectively inserting one of these series capacitors in the transmission line (illustrated in FIG. 1), this compensates for inductive reactance to a predetermined compensation level. Thus, the reactive impedance of the overall transmission line is controlled, increased or decreased, as desired.

In the system shown in FIG. 1, when the largest compensation level is desired only a single capacitor or series element is connected with the others being switched out of the circuit; thus, the capacitor $X_1$, for example, in FIG. 1 must be designed for the largest current.

FIG. 2, also prior art, illustrates the practical design of capacitors $X_1$ where it is actually a bank of series and parallel capacitors. The dashed lines indicate the connection to the other parallel capacitors which are individually switched in and out of the circuit. Other portions of the capacitor module $X_1$ include the safety bypass switch 11 and a non-linear resistor 12. In one case it has been suggested that the capacitor module might include a single mechanical bypass 13 which can control the percent series compensation capacitance level of the single unit as a one-time adjustment. This was discussed in a paper by E.W. Kimbark entitled "Improvement of System Stability by Switched Series Capacitors" (IEEE Transactions on Power Apparatus and Systems), Vol. PAS-85, Feb. 1966, pp. 180–188. In essence, a single capacitor bank was divided into two sections and a one-time mechanical switch provided for determining percent compensation.

A difficulty with the above scheme of using a bank of parallel capacitor modules is that the installed VAR capacity is excessive. And this is especially true if it is desired to utilize such compensation scheme for automatic and controllable variations in response to the monitoring of a parameter of the transmission line, such as subsynchronous oscillation, etc.

OBJECTS AND SUMMARY OF INVENTION

Thus, it is the general object of the present invention to provide an improved apparatus for controlling the reactive impedance of a transmission line.

In accordance with the above object, there is provided apparatus for controlling the reactive impedance of a transmission line where capacitive reactance is inserted in series in the line to compensate inductive reactance to a predetermined compensation level where the reactive impedance is lowered. The apparatus comprises a plurality of three or more capacitor modules, each having a predetermined capacitive reactance, connected to each other in series to form a series combination of capacitor modules having a combined capacitive reactance represented by the arithmetic sum of the predetermined capacitive reactances. The combined capacitive reactance provides a maximum compensation level where reactive impedance of the line is at a minimum level The predetermined capacitive reactance of each of the capacitor modules varies in magnitude from a maximum to a minimum in substantially geometric steps for providing modulation of the compensation level from the maximum to a minimum. At least a portion of the modules includes solid state bypass switches with control inputs for conductively bypassing a selected module or modules in the series combination.

Control means are connected to the control inputs of substantially all of said modules for automatically varying the combined capacitive reactive in response to a desired change in one or more parameters of the transmission line.

DETAILED DESCRIPTION OF PREFERRED EMBODIMENTS

Figure 3:
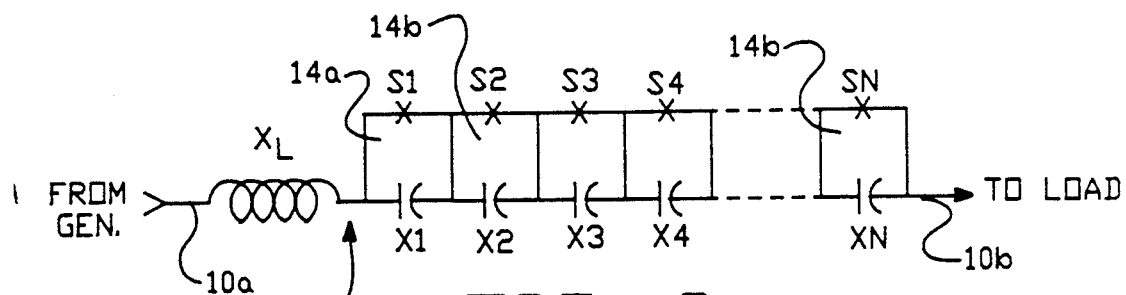
FIG. 3 is a circuit diagram of a reactive impedance compensation technique embodying the present invention.

FIG. 3 illustrates a series compensation capacitive reactance embodying the present invention. It includes a plurality of capacitor modules 14a through 14n which are connected to each other in series to form a series combination of capacitor modules having a combined capacitive reactance represented by the arithmetic sum of the capacitive reactances; these are designated $X_1$, $X_2$ through $X_n$. They are series connected in the line between the generator end 10a and the load end 10b. As is apparent from examination of FIG. 3, any one or all of the capacitive reactances $X_1$ through $X_n$ may be inserted in series in the transmission line 10 by selective activation of the bypass switches $S_1$ through $S_n$.

With all of the capacitive reactances in series and with the bypass switches open, the combined capacitive reactance of all of the modules provides a maximum compensation level where the total reactive impedance of the transmission line is at a minimum level. This means that the inductive reactance of the transmission line has been at least partially compensated for. From a practical point of view, it is desired to minimize the reactive impedance of the transmission line but to a level that is less than 100% of the line's inductive reactance. A practical limit may be 90%; that is, the capacitor reactance compensates for 90% of the inductive reactance due to the transmission line itself. This maintains the controllability and stability of the transmission line. Depending on the system use, such compensation may typically be at a 25 to 60% level. The 90% level would more typically be utilized in a feedback control system where it is desired to momentarily compensate for power or current surges.

Figure 1:
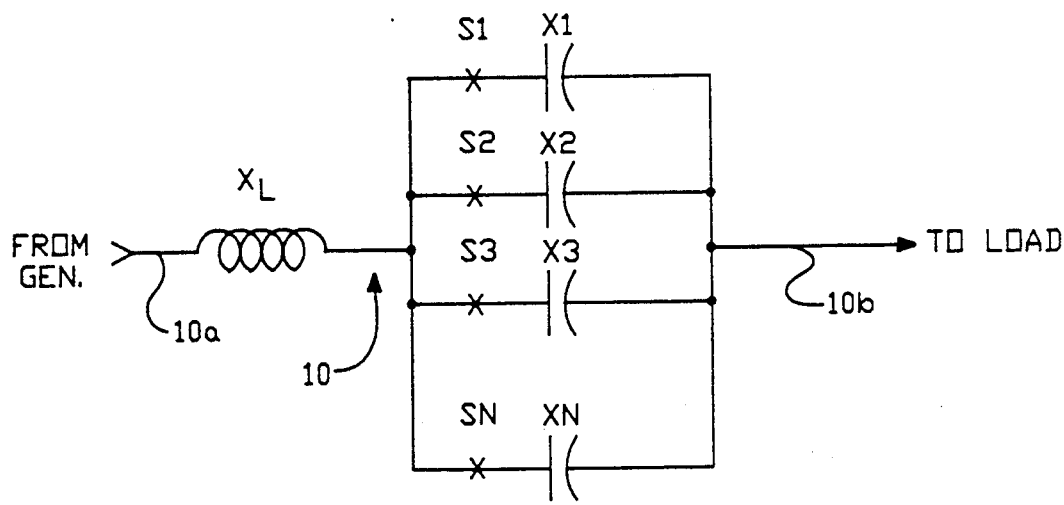
FIG. 1 is a circuit diagram of a prior art reactive compensation technique.
Figure 2:
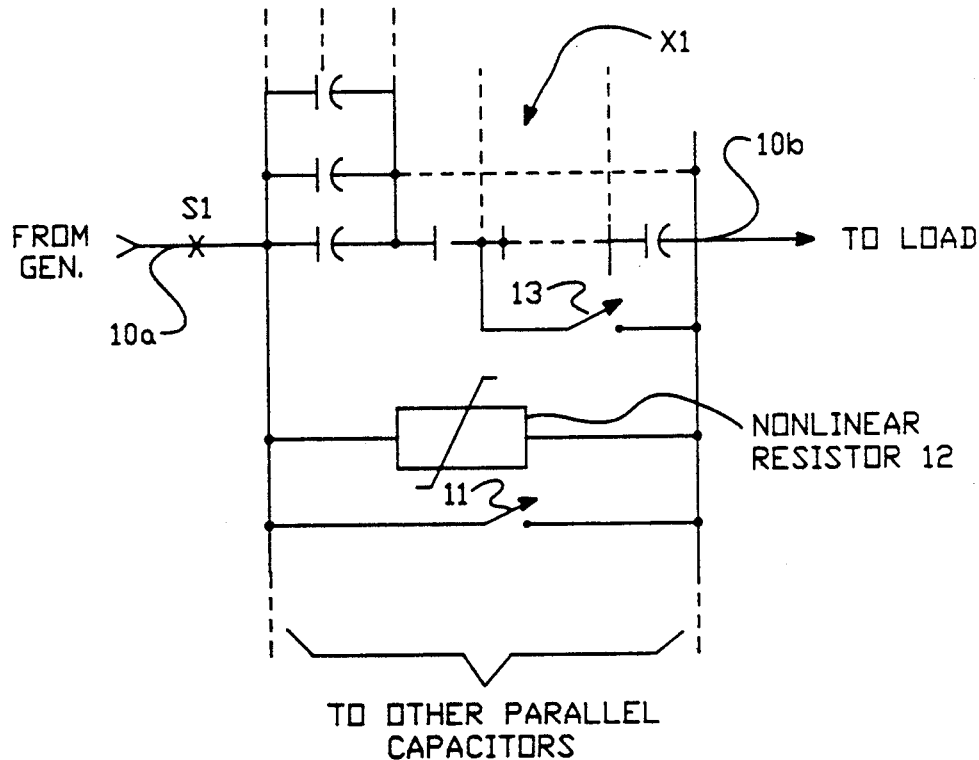
FIG. 2 is a more detailed circuit diagram of a portion of FIG. 1, which also illustrates the prior art.

One advantage of the series connection of capacitor modules is that the installed KVAR capacity of the installation is reduced since the maximum compensation level occurs with all capacitors connected. Thus the capacitive reactance $X_1$ which would typically have the highest capacitance (meaning the lowest capacitive reactance) would determine the smallest percent change in compensation level. This is in contrast to the parallel connection illustrated in FIGS. 1 and 2 where, when the largest compensation is desired, only a single capacitor module would be utilized.

Figure 4:
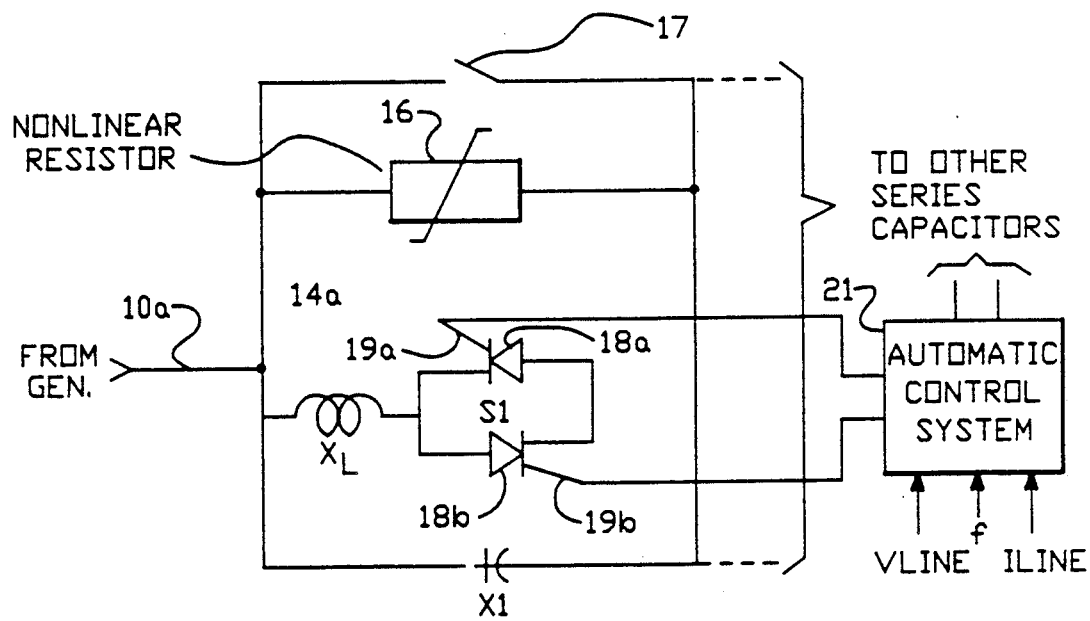
FIG. 4 is a more detailed circuit block diagram of a portion of FIG. 3.

A typical module 14a is illustrated in FIG. 4 which, while including the capacitive reactance $X_1$, has an inductive reactance XL (which is only used to limit current surges when thyristors are turned on), a non-linear resistor 16, a safety bypass switch 17, and inversely connected back to back switching thyristors 18a and 18b. These are connected across or in parallel with the capacitive reactance $X_1$ to form a switch $S_1$, as illustrated more schematically in FIG. 3 in connection with module 14a. Normally, thyristors 18a, 18b would consist of several in series to meet voltage requirements; thus, they form a bypass switch to conductively bypass a selected module or modules in the desired series combination. Safety bypass switch 17 may, in a practical installation, bypass several modules 14.

Each solid state thyristor switch 18a, 18b includes control inputs 19a, 19b which are connected to and controlled by an automatic control system 21. This senses the parameters of the transmission line 10, including the voltage, current and/or frequency, as indicated. The control system is also connected to the other switches $S_2$, $S_3$, etc., of the modules 14a through 14n, as illustrated in FIG. 3.

Figure 5:
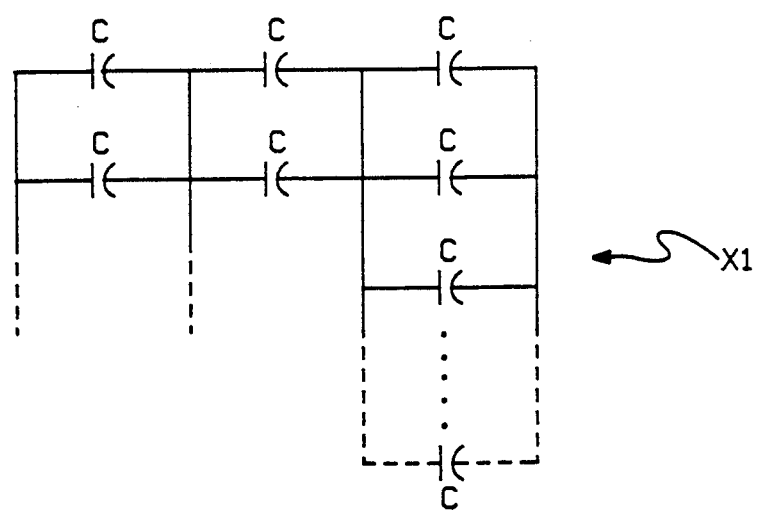
FIG. 5 is a more detailed circuit diagram of a portion of FIG. 4.

Each capacitive reactance $X_1$, $X_2$, etc., must be designed for the maximum current expected in the transmission line when that particular module is to be used. Thus, as illustrated in FIG. 5, typically the capacitor module will include many capacitor units, C, in parallel and/or in series, as illustrated. In fact, the individual capacitors represented in FIG. 5 may be purchased as capacitor "CANs" or a combination thereof. A typical rating of one capacitor CAN might be with a capacitance of 4.7 microfarads rated at 14 kV with a current of 23 amperes. Another type of CAN available commercially has the same current and voltage ratings but with 40 microfarads of capacitance.

To provide good controllability in conjunction with the automatic control system 21 of FIG. 4, the individual capacitor modules 14a–14n should have predetermined capacitive reactances varying in magnitude from a maximum to a minimum in substantially geometric steps for providing a smooth modulation of the compensation level. In fact, such capacitive reactances may be determined by the following formula:

$$X_n = 2^n X_1$$

where X is capacitive reactance, $X_1$ is the smallest reactance chosen for desired minimum compensation and n is an integer varying from 0 to the total number of modules. Thus, the capacitive reactance values would follow a binary series of 1, 2, 4, 8, 16, 32, etc. The smallest element $X_1$ determines the smallest change of the compensation impedance which is possible. And when all elements are connected in the circuit (that is, not bypassed by the thyristor switches), the compensation level of the line is the highest. Since the impedance of a capacitor is inversely proportional to the value of the capacitance, the largest capacitance is used for $X_1$ and the smallest for $X_n$.

Not all of the modules need to be bypassed for some control conditions. Thus for control purposes only some of the modules need to have the S switching thyristors 18a, 18b (as illustrated in FIG. 4). However, three or more modules are necessary for effective control purposes.

Figure 6:
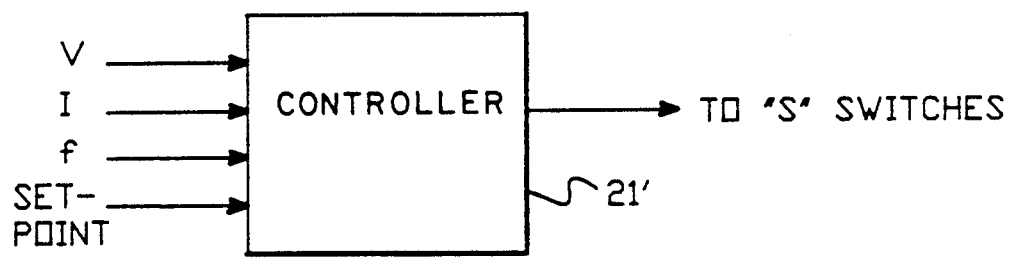
FIG. 6 is a block diagram illustrating one embodiment of the invention.

One parameter which can be controlled by a variation in network impedance is the power flow across an AC line. FIG. 6 illustrates how this is accomplished where a change of power ($\Delta$power) may be expressed as the product of power and a change of capacitive reactance divided by the overall reactance. Thus, this is illustrated by the formula $$\Delta \text{ power} = \frac{\text{power} \cdot \Delta X}{X}$$

For the above equation the $\Delta$ quantities are changes in power and net line impedance. As illustrated in FIG. 6, to accomplish this the controller 20' compares a setpoint (e.g., initial line current) with the existing line current, a transfer function is applied, and then the appropriate "S" switches actuated to give a desired $\Delta X$. This can be used for either a change of power flow or to correct for power surges in the line. Referring to the above cited paper at the International Conference on Large High Voltage Electric Systems, this is known as Rapid Adjustment of Network Impedance (RANI). The purpose is to provide a smooth flow of power. Other control objectives such as voltage, current, frequency or combinations thereof can similarly be accomplished.

When the technique is used to control power flow in general across the line, the above equation assumes a simple model in that the networks at the two ends of the line are unaffected by the changes in power flow, which is obviously not the case. However, the bypass thyristor switches 18a, 18b can be operated so fast that this assumption is valid for a short time period after the change. Thus, with the switched series compensation of the present invention, as illustrated in FIGS. 3 and 4, the desired power flow can be achieved with a desired angle between the sending and receiving ends in automatic response to changes in measurement of the parameters of the transmission line, such as frequency, power flow, line currents, phase angle measurements, etc. This can dampen the transients in the power system.

Figure 9:
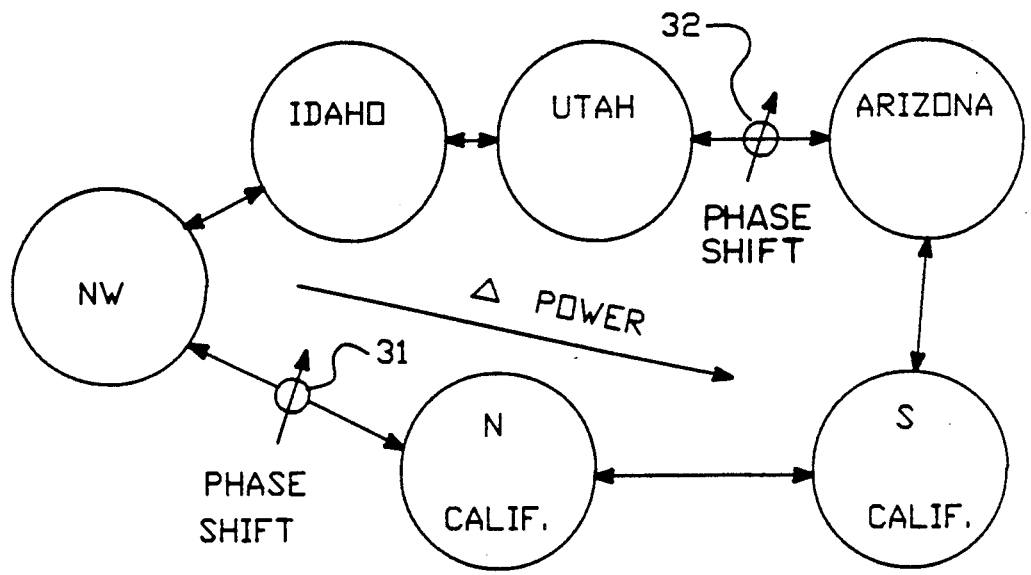
FIG. 9 is a circuit network diagram useful in understanding the invention.

One particular use of a change of network impedance which will also impliedly cause a phase shift is illustrated in FIG. 9, where various power grids are geographically indicated as NW (for Northwest United States), Idaho, Utah, Arizona, Northern California and Southern California. Assuming an outtage in Southern California, power can be directed to Southern California via the shortest route (that is, via Northern California) by the adjustment of network impedance by the indicated phase shift networks 31 and 32. Each of these is, of course, a thyristor controlled series compensator embodying the present invention. Phase shift network 32 can be adjusted to assure that no power is inadvertently transmitted via the longer route of Idaho and Utah.

Figure 7:
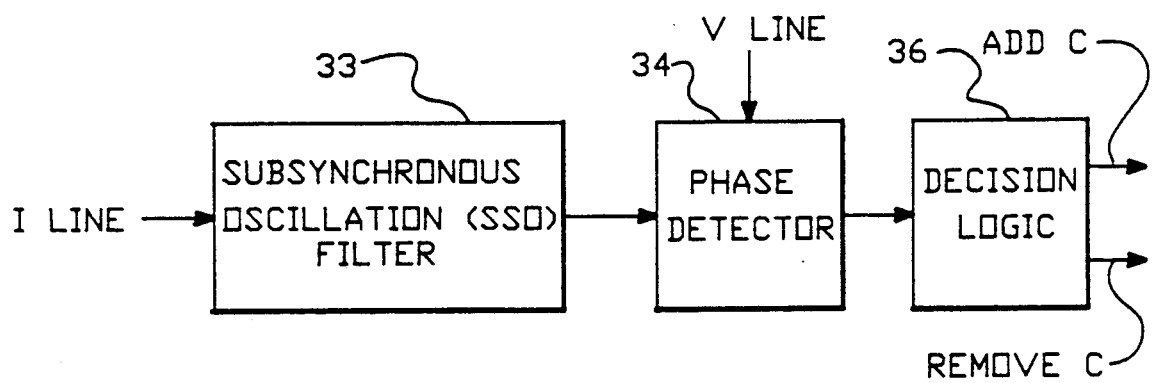
FIG. 7 is a block diagram illustrating another embodiment of the invention.
Figure 8:
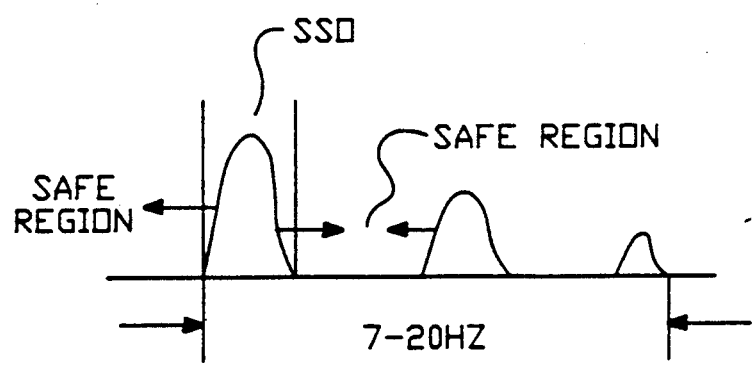
FIG. 8 are characteristic curves illustrating the operation of FIG. 7.

Another control technique which can be effectively practiced by the present invention and its compensation system of several modules in series is that subsynchronous oscillations (SSO) can be eliminated. This has heretofore been proposed in general, as illustrated in Hingorani patent 4,292,545, assigned to the present assignee. Such subsynchronous oscillations (SSO) may occur, as illustrated in FIG. 8, at a frequency of 7 to 20 Hz. Three peaks are indicated in FIG. 8. To avoid these regions and to move the power line into "safe regions," FIG. 7 illustrates a use of a line current filter 33 to determine the peaks illustrated in FIG. 8. A phase detector 34 responds to the line voltage to further specify the oscillation peaks and then a decision logic unit 36 determines the capacitance needed to shift to a safe region, as illustrated in FIG. 8. In effect, the automatic control system of FIG. 7 would be in the unit 21, as illustrated in FIG. 4.

Figure 10:
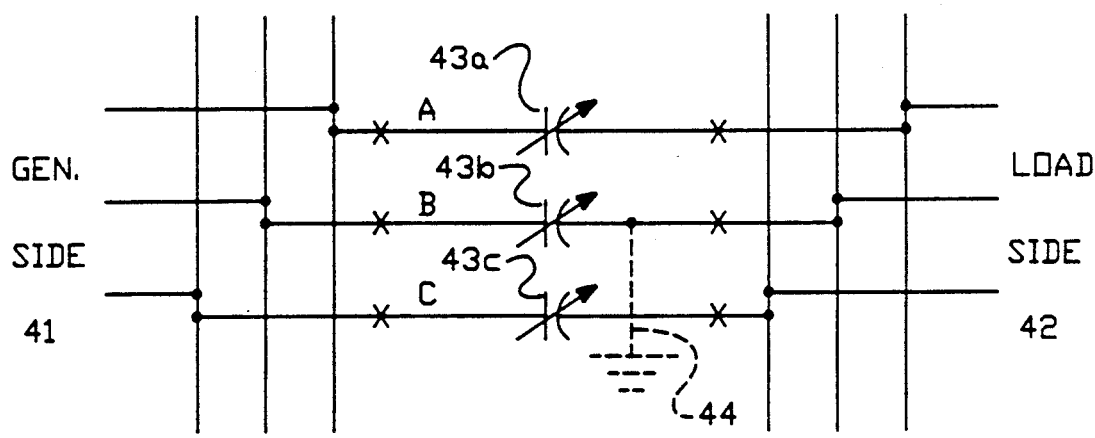
FIG. 10 is a transmission line network illustrating an application of the invention.

FIG. 10 shows another application of the present invention where there is illustrated a three-phase transmission line system with the phases A, B and C. There is a generator side 41 and a load side 42 which are interconnected on the three phases by breaker switches (indicated by the 'Xs') of the trip/reclose type. Then each series connected variable capacitance unit shown as 43a through 43c are in series in each phase; these units may be constructed as illustrated, of course, in FIG. 3.

The system would operate in the following manner under the control of the automatic control system 21 of FIG. 4. Assuming a fault to ground as indicated at 44 on phase B, the reactance 43b would have its bypass switches of its thyristor controlled series compensation banks closed so that any capacitance is removed from the circuit. This will immediately of course, since there is no compensation, increase the impedance of the circuit; thus, reducing the fault current and allowing the breakers to open under lower current conditions for phase B.

Next, the compensation of phases A and C would be increased to the maximum during the fault. This will allow more power to flow on these two phases.

The foregoing will continue until phase B and the breakers reclose, at which time the compensation of phases A, B, and C will be made equal again.

Thus, in summary, the control means 21 is responsive to a fault in one line to temporarily increase impedance in such line (by bypassing all of the capacitive reactance—thus reducing the effective compensation level) and reducing impedance (increasing to a maximum compensation level) on the two remaining lines.

Thus, with the series compensation concept of the present invention, there is a possibility of detecting evolving subsynchronous oscillations which sense if such oscillations are growing. Once this is identified, several capacitor modules in a coordinated manner may be switched to a safe region above or below the point of oscillation. Once the compensation is off resonance, the oscillations will be dampened quickly as a result of the natural damping in the network The foregoing is all made possible by the fact of the substantially geometric relationships of the capacitive reactances so that a vernier type control may be utilized. Also, the series combination provides for an economical utilization of capacitors compared to previous techniques outlined in FIGS. 1 and 2.

Thus, an improved apparatus for controlling the reactive impedance of a transmission line has been provided.

What is Claimed

1. Apparatus for controlling the reactive impedance of a transmission line where capacitive reactance is inserted in series in said line to compensate inductive reactance to a predetermined compensation level where the reactive impedance is lowered, said apparatus comprising:

a plurality of three or more capacitor modules, each having a predetermined capacitive reactance, connected to each other in series to form a series combination of capacitor modules having a combined capacitive reactance represented by the arithmetic sum of said predetermined capacitive reactances, said combined capacitive reactance providing a maximum said compensation level where reactive impedance of said line is at a minimum level;

said predetermined capacitive reactance of each of said capacitor modules varying in magnitude from a maximum to a minimum in substantially geometric steps for providing modulation of said compensation level from said maximum to a minimum, at least a portion of said modules including solid state bypass switches with control inputs for conductively bypassing a selected module or modules in said series combination;

control means connected to the control inputs of substantially all of said modules for automatically varying said combined capacitive reactance in response to a desired change in a parameter of said transmission line.

2. Apparatus as in claim 1 where said parameter includes one of line current, voltage, power, frequency and said reactive impedance is adjusted to control transmitted power.

3. Apparatus as in claim 1 where said parameter is subsynchronous resonance and said reactive impedance is adjusted to eliminate said resonance.

4. Apparatus as in claim 1 where said parameter is phase shift of said transmission line.

5. Apparatus as in claim 1 where said solid state bypass switches are a pair of inversely connected thyristors.

6. Apparatus as in claim 1 where said geometric steps of said capacitive reactances of said modules are:

$$X_n = 2^n X_1$$

where X is capacitive reactance, $X_1$ is the smallest reactance chosen for a desired minimum compensation and n is an integer varying from 0 to the total number of modules.

7. Apparatus as in claim 1 where a said series combination of capacitor modules is provided in each line of a three phase transmission line and where said control means is responsive to a fault in one line to temporarily increase impedance in such line and to reduce impedance (increase compensation) in said remaining lines.

* * * * *